(12) United States Patent
Hallberg et al.

(10) Patent No.: US 11,878,561 B2
(45) Date of Patent: Jan. 23, 2024

(54) WHEEL SUSPENSION ARRANGEMENT

(71) Applicant: Ningbo Geely Automobile Research & Development Co., Ltd., Ningbo (CN)

(72) Inventors: Linus Hallberg, Säve (SE); Martin Edberg, Gothenburg (SE)

(73) Assignee: NINGBO GEELY AUTOMOBILE RESEARCH & DEV. CO., LTD., Ningbo (CN)

( * ) Notice: Subject to any disclaimer, the term of this patent is extended or adjusted under 35 U.S.C. 154(b) by 0 days.

(21) Appl. No.: 17/503,301

(22) Filed: Oct. 16, 2021

(65) Prior Publication Data
US 2022/0032712 A1 Feb. 3, 2022

Related U.S. Application Data

(63) Continuation of application No. PCT/CN2020/079983, filed on Mar. 18, 2020.

(30) Foreign Application Priority Data

Apr. 24, 2019 (EP) .................................... 19170755

(51) Int. Cl.
*B60G 17/02* (2006.01)
*B60G 11/14* (2006.01)

(52) U.S. Cl.
CPC ............ *B60G 17/021* (2013.01); *B60G 11/14* (2013.01); *B60G 2202/12* (2013.01); *B60G 2500/22* (2013.01)

(58) Field of Classification Search
CPC .. B60G 17/021; B60G 11/14; B60G 2202/12; B60G 2500/22; F16F 1/121
See application file for complete search history.

(56) References Cited

U.S. PATENT DOCUMENTS

| | | | | |
|---|---|---|---|---|
| 4,832,321 A | * | 5/1989 | Aardema ............... | B60G 11/14 267/287 |
| 2005/0269178 A1 | * | 12/2005 | Huang .................... | F16F 9/461 188/300 |

FOREIGN PATENT DOCUMENTS

| | | |
|---|---|---|
| CN | 1368609 A | 9/2002 |
| CN | 2844566 Y | * 12/2006 |
| CN | 2844566 Y | 12/2006 |
| CN | 107420646 A | 12/2017 |
| DE | 2822105 A1 | 11/1979 |

(Continued)

OTHER PUBLICATIONS

DE-102012003199-A1 Machine English translation (Year: 2011).*

(Continued)

*Primary Examiner* — Jason D Shanske
*Assistant Examiner* — Matthew James O'Neill
(74) *Attorney, Agent, or Firm* — Tucker Ellis LLP

(57) ABSTRACT

A wheel suspension arrangement including a suspension spring, at least one control member arranged to control a stiffness of said suspension spring. The control member is displaceable relative to said suspension spring between a retracted position, in which the control member does not interfere with an operation of the suspension spring, and an advanced position, in which it interferes with the operation of the suspension spring in a way that the stiffness of said suspension spring is increased. The wheel suspension arrangement further includes a biasing means configured to bias said control member towards said retracted position.

19 Claims, 5 Drawing Sheets

(56) References Cited

FOREIGN PATENT DOCUMENTS

| | | | | |
|---|---|---|---|---|
| DE | 102007007630 A1 | 8/2008 | | |
| DE | 102012003199 A1 * | 8/2013 | ............ | B60G 11/14 |
| DE | 102017205671 A1 | 10/2018 | | |
| DE | 102019218862 A1 * | 7/2020 | ............ | B60G 17/02 |
| GB | 1037838 A | 8/1966 | | |
| JP | 2008230469 A | 10/2008 | | |

OTHER PUBLICATIONS

CN2844566Y Machine English translation (Year: 2006).*
Yufeng, CN2844566Y, 2006, Machine English translation (Year: 2006).*
Haupts, DE-102019218862-A1, 2020 (Year: 2020).*
International Search Report from corresponding International Application No. PCT/CN2020/079983, dated Jun. 19, 2020, 2 pages.

* cited by examiner

WHEEL SUSPENSION ARRANGEMENT

RELATED APPLICATION DATA

This application is a continuation of International Patent Application No. PCT/CN2020/079983, filed Mar. 18, 2020, which claims the benefit of European Patent Application No. 19170755.3, filed Apr. 24, 2019, the disclosures of which are incorporated herein by reference in their entireties.

TECHNICAL FIELD

The present invention relates to a wheel suspension arrangement having independent left and right sides.

BACKGROUND

Conventional wheel suspension arrangements often comprise anti-roll bars designed to transfer the suspension stiffness of a wheel pair from the wheel suspension on one side of the vehicle to the wheel suspension on the opposite side of the vehicle (for example left front wheel to right front wheel). This causes less tilting or roll of the vehicle when performing a sharp turn. However, if the vehicle hits a bump with the wheels on one side, the anti-roll bar will also transfer stiffness to the opposite side, thus resulting in the bump being translated to the wheels on the opposite side as well. This makes hitting bumps with the vehicle less comfortable for its occupants. As such, a conventional anti-roll bar is a trade-off between turn comfort and single-side bump handling.

U.S. Pat. No. 4,832,321 discloses a coil spring assembly for the suspension of a vehicle including a series of plates whose tapered edges protrude between the coils of the spring. The plates are mounted on bolts that are parallel to the longitudinal axis of the spring, the bolts being moveable toward or away from the longitudinal axis of the spring. The resulting movement of the plates toward or away from the spring causes a thicker or thinner zone of the tapered edge of the plate to be disposed between the spring coils, thereby changing the degree to which the plates stiffen the spring.

This allows a user to control the stiffness of the suspension of the vehicle by adjusting the position of the bolt. However, this adjustment needs to be done while the vehicle is stationary. As such, this assembly cannot be used to actively control the suspension stiffness in real-time based on current driving conditions.

SUMMARY

It is an object of the present invention to alleviate at least some of the mentioned drawbacks of the prior art and to provide a wheel suspension arrangement that actively controls the suspension stiffness based on current driving conditions, and which combines turn comfort with single-side bump handling capabilities, thus eliminating the need for a conventional anti-roll bar. This and other objects, which will become apparent in the following, are accomplished by a wheel suspension arrangement as defined in the accompanying independent claim.

The term exemplary should in this application be understood as serving as an example, instance or illustration.

The invention is based on the realization that by decoupling the conventional anti-roll bar into two separate and independent turn-handling functions, the drawbacks of stiffness transferring when single-sidedly hitting bumps can be avoided. In the present invention, each wheel in a wheel pair is provided with a wheel suspension having its own integrated anti-roll function. This is beneficial, as such a wheel suspension arrangement allows turn comfort to be combined with single-side bump handling.

The present invention is furthermore based on the realisation that this may be achieved by connecting the suspension spring of the wheel suspension arrangement to a support member having horizontally extending slots in which spring-loaded rods or control members are adapted to slide when the vehicle is turning. The springs connected to the control members have different spring constants, such that the sharper the vehicle is turning, the more control members will engage in the suspension spring, thereby making it stiffer. The suspension may, in addition to a suspension spring, have additional components such as a shock absorber and/or an additional spring for increased travel comfort.

The present invention is furthermore based on the realisation that providing such a wheel suspension arrangement allows for increased comfort when driving sideways in a steep slope. In this case, the control members are subjected to a gravitational force that has a component in a direction that is parallel with their sliding direction. This causes a number of the control members to engage in the suspension spring, thus causing it to stiffen and making the vehicle less tilted during those situations.

Finally, the wheel suspension arrangement of the present invention could also be implemented in the vehicle's driving direction, stiffening the front suspension when braking or driving downhill and stiffening the rear suspension when accelerating or driving uphill.

According to the first aspect of the present invention, a wheel suspension arrangement is provided. The wheel suspension arrangement comprises a suspension spring, and at least one control member arranged to control a stiffness of said suspension spring. The control member is displaceable relative to said suspension spring between a retracted position, in which the control member does not interfere with an operation of the suspension spring, and an advanced position, in which it interferes with the operation of the suspension spring in a way that the stiffness of said suspension spring is increased. The wheel suspension arrangement further comprises a biasing means configured to bias said control member towards said retracted position.

Having a wheel suspension arrangement as described above allows for individual control of the stiffness of either wheel. For example, the wheel suspension arrangement of the present invention may be provided in connection with either wheel, a single wheel pair of a vehicle, or for all wheels of a vehicle. Thus, certain driving situations and conditions causes the stiffness of the wheel suspension arrangement to increase, while other driving situations or conditions do not cause the stiffness of the suspension spring to increase.

According to one exemplary embodiment of the present invention, the control member is displaceable relative to said suspension spring between a retracted position, in which the control member does not restrict the compression of the suspension spring, and an advanced position, in which it restricts the compression of the suspension spring in a way that the effective stiffness of said suspension spring is increased.

According to one exemplary embodiment of the present invention, said control member, in said advanced position, decreases an effective length of the suspension spring.

The effective length of the suspension spring is to be understood as being the distance the suspension spring may be elastically compressed as a result of axial forces acting upon the spring from the vehicle body and the wheel.

As the spring constant of a spring is inversely proportional to its length, decreasing the effective length of the spring increases the effective spring constant of that spring. As such, the control members increase the effective spring constant of the suspension spring when in the advanced position. By having the control members for the wheels on only one side of the vehicle move to the advanced position when a stiff spring is required, such as in a sharp turn, a single-sided spring stiffening is achieved.

According to one exemplary embodiment of the present invention, said control member intersects said suspension spring in said advanced position. This decreases the effective length of the spring, thus increasing the effective spring constant as described above. The intersection may be partial, in that the control members intersect one half of the spring coil, or complete, in that the control members intersect the entire spring coil, i.e. extending through it.

According to one exemplary embodiment of the present invention, said control member is displaceable in a direction transverse to a longitudinal axis of the suspension spring.

According to one exemplary embodiment of the present invention, said suspension spring is a coil spring and the control member is arranged to protrude between the coils of the spring in said advanced position. By protruding through the coils of the spring, at least one control member fixes a portion of the coil in relation to the vehicle body. This decreases the effective length of the coil, thus increasing its stiffness.

According to one exemplary embodiment of the present invention, the wheel suspension arrangement comprises a support member arranged to support the control member in the advanced position. In one exemplary embodiment, the support member is arranged to support the control member in both the advanced and the retracted position. The support member may either be fixedly attached to the vehicle body, or it may be connected thereto by means of a support spring. The support spring increases driving comfort by allowing for a smoother ride compared to suspension arrangements that are fixedly attached to the vehicle body.

According to one exemplary embodiment of the present invention, said support member comprises at least one slot, inside which said control member is arranged and along which said control member is displaceable. This slot may alternatively be referred to as a track or a groove, inside of which the control member is slidably arranged. The position of the slots in relation to the suspension spring is such that the control members, when moving from a retracted position to an advanced position, enters the suspension spring between its coils.

According to one exemplary embodiment of the present invention, the wheel suspension arrangement comprises a plurality of control members, which are arranged to affect the suspension spring at spaced locations in a longitudinal axis of the suspension spring. This allows for step-wise stiffening of the suspension spring, by engaging the suspension spring with one control member at a time.

According to one exemplary embodiment of the present invention, the plurality of control members are arranged in parallel with each other. The control members may for example be arranged in the same direction as the centrifugal force that results from when a vehicle onto which the wheel suspension arrangement is connected takes a sharp turn, or brakes or accelerates rapidly. The wheel suspension arrangement, when attached between a wheel and a vehicle body, may be oriented such that the control springs bias the control members in a direction towards a vehicle centreline that is perpendicular with the longitudinal extension of the vehicle. This allows inertial forces resulting from the vehicle accelerating or decelerating to cause a number of the control members to slide into engagement with the suspension springs on the rear or front wheel pair, respectively.

According to one exemplary embodiment of the present invention, said biasing means comprises a plurality of control springs, wherein each one of said plurality of control members is coupled to a respective control spring. This enables individual biasing of the control members towards the retracted position, such that they may move between retracted and advanced position independently of each other.

According to one exemplary embodiment of the present invention, at least two of the control springs are arranged with different stiffnesses. By having the control springs for the plurality of control members be provided at different spring constants or stiffnesses, it is possible to control at which centrifugal force each individual control member moves from the retracted position to the advanced position. Thus, step-wise stiffening of the suspension spring as a function of the magnitude of the centrifugal force resulting from a sharp turn or a rapid acceleration or deceleration is enabled. In other words, the sharper a vehicle provided with the wheel suspension arrangement of the present invention turns, the more the suspension spring on one side of the vehicle is stiffened.

According to one exemplary embodiment of the present invention, the wheel suspension arrangement has a wheel connecting side and a vehicle body connecting side, wherein control members located closer to the wheel connecting side are more strongly biased towards the retracted position than control members located closer to the vehicle connecting side.

According to one exemplary embodiment of the present invention, the wheel suspension arrangement has a wheel connecting side and a vehicle body connecting side, wherein the stiffness of the control springs increases from the vehicle body connecting side to the wheel connecting side.

According to one exemplary embodiment of the present invention, said control member is displaceable along a direction that is perpendicular to a longitudinal axis of the suspension spring.

According to one exemplary embodiment of the present invention, said control member is slidably displaceable when the wheel suspension arrangement is subjected to a force that is perpendicular to a longitudinal axis of the suspension spring. The control members and the control springs are configured such that the control members move from the retracted position to the advanced position once the control members are subjected to a force exceeding a predetermined threshold value. This predetermined threshold value may differ from one control member to the others, with the threshold increasing from the control member located closest to the vehicle body connecting side to the control member located closest to the wheel connecting side.

According to a second aspect of the present invention, a vehicle having a wheel suspension arrangement according to the first aspect of the present invention is provided. It should be understood that the embodiments of the first aspect of the invention are equally applicable to the second aspect of the invention.

Generally, all terms used in the description are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise.

BRIEF DESCRIPTION OF THE DRAWINGS

Features and advantages of the present invention will now be further clarified and described in more detail, with reference to the appended drawings showing different embodiments of a wheel suspension arrangement and a vehicle provided with such an arrangement according to the present invention.

DETAILED DESCRIPTION

In the following detailed description, some embodiments of the present invention will be described. However, it is to be understood that features of the different embodiments are exchangeable between the embodiments and may be combined in different ways, unless anything else is specifically indicated. Even though in the following description, numerous specific details are set forth to provide a more thorough understanding of the present invention, it will be apparent to one skilled in the art that the present invention may be practiced without these specific details. In other instances, well known constructions or functions are not described in detail, so as not to obscure the present invention.

Figure 1A:
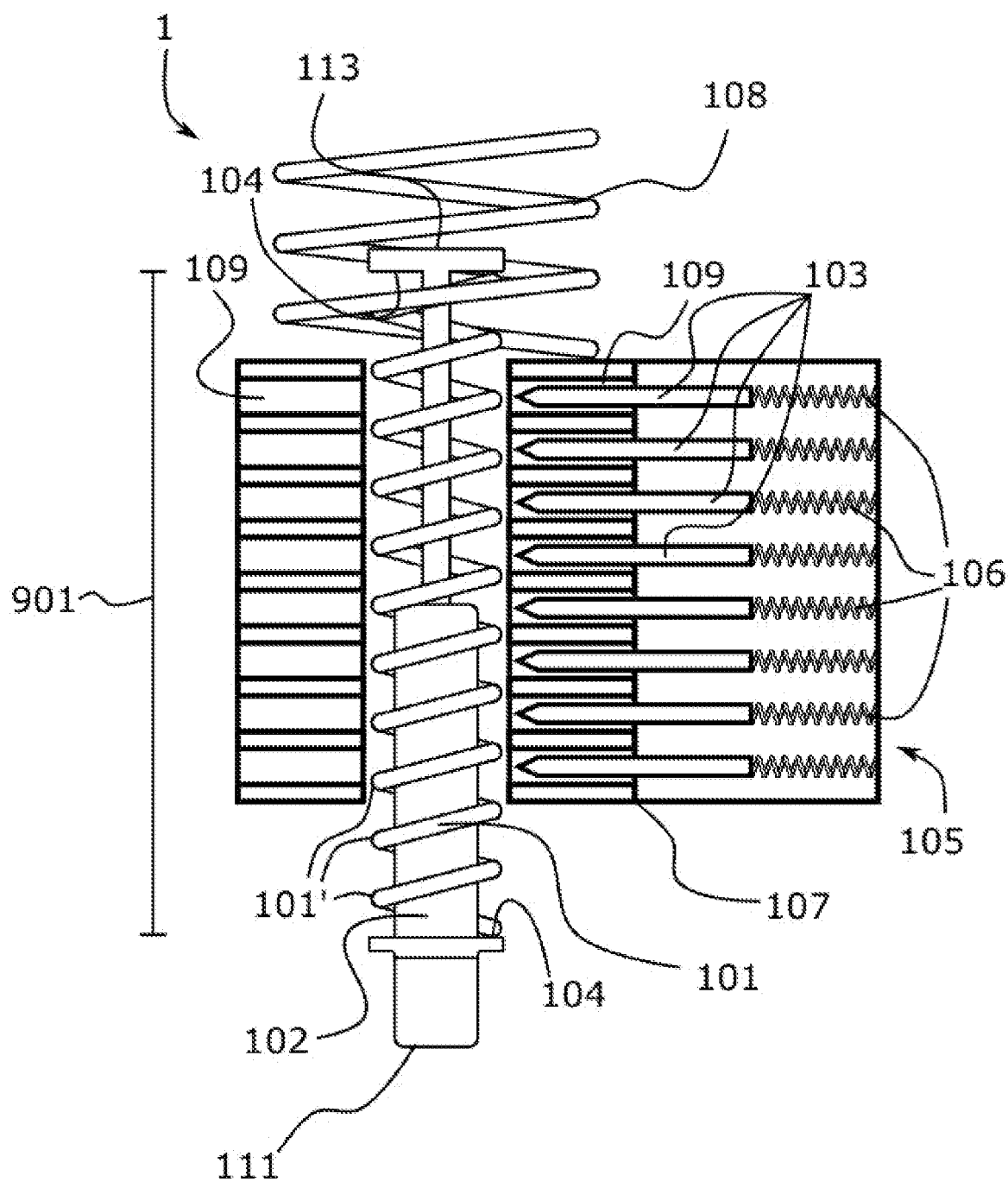
FIG. 1A is a schematic view of the wheel suspension arrangement of the first aspect of the present invention.

FIG. 1A is a schematic view of the wheel suspension arrangement 1 of the first aspect of the present invention. The wheel suspension arrangement 1 comprises a damper 102 and a suspension spring 101 connected to the damper 102. The damper 102 has a wheel connecting side 111 arranged to be connected to a wheel of a vehicle, and a vehicle body connecting side 113 arranged to be connected to a vehicle body. The suspension spring 101 extends between the two sides 111, 113 of the damper 102 and exerts a force that counteracts compression of the damper 102. The suspension spring 101 is a coil spring, the ends of which abut corresponding abutment portions 104 on each end 111, 113 of the damper 102.

The wheel suspension arrangement 1 further comprises control members 103 or control rods slidably arranged so that they may move between a retracted position, in which they do not interfere with the compression or elongation of the suspension spring 101, and an advanced position, in which the control members 103 protrude between the coils 101' of the suspension spring 101. This causes the effective length 901 of the suspension spring 101 to decrease, thus increasing its stiffness. As such, the stiffness of the suspension spring 101 may be controlled by selectively engaging the suspension spring 101 with a number of control members 103, that number being determined by the need for suspension stiffness, i.e. the current driving conditions. In FIG. 1A however, all control members 103 are in the retracted position.

The control members 103 are arranged inside a support member 107 or housing that is arranged adjacent to the suspension spring 101. The support member 107 comprises a plurality of slots 109 or tracks inside of which the control members 103 are slidably arranged. In the illustrated embodiment, the support member 107 is provided on both sides of the suspension spring 101, such that when the control members 103 protrude through the coils 101' of the suspension spring 101, they may be received by the slots 109 on portion of the support member 107 on the opposite side of the suspension spring 101. This increases the stability of the control members 103 as they lock the coils 101' of the suspension spring 101 in place.

The support member 107 comprises a support spring 108 that may be used, in addition to the vehicle body connecting side 113 of the damper 102, to attach the wheel suspension arrangement 1 to a vehicle. The support spring 108 further increases driving comfort by taking up a portion of the shocks and vibrations from the road and smoothens out the "steps" that may be felt in the vehicle when each control member is being engaged in the suspension spring.

The slots 109 are arranged to guide the control members 103 in a direction between the retracted position and the advanced position. In the illustrated embodiment, this direction is perpendicular to the longitudinal axis of the suspension spring 101. However, variations to this angle are conceivable depending on for example spring geometry or the relative positions of the control members 103 and the suspension spring 101.

The control members 103 are provided in individual slots 109 inside the support member 107, at locations spaced apart along a direction that is parallel to a longitudinal axis of the suspension spring 101. Thus, each control member 103 is arranged to engage different portions of the suspension spring 101 than the other control members 103.

Furthermore, the wheel suspension arrangement 1 comprises biasing means 105 that are configured to bias the control members 103 towards the retracted position. The biasing means 105 comprises a plurality of control springs 106, and each one of the control members 103 is coupled to a respective control spring 106. This allows for individual control of the biasing strength of the control members 103, by providing control springs 106 with varying stiffness for different control members 103. The control springs 106 extend between one end of the control members 103 and the support member 107, such that the control members 103 are connected to the support member 107 by the control springs 106. In the illustrated embodiment, the control spring 106 closest to the wheel connecting side 111 is stiffer than the control spring 106 located directly adjacent to it, towards the vehicle body connecting side 113 of the wheel suspension arrangement 1. This continues for each control spring 106, with decreasing stiffness for each step towards the vehicle body connecting side 113. Thus, the control members 103 located closer to the wheel connecting side 111 are more strongly biased towards the retracted position than control members 103 located closer to the vehicle connecting side 113.

Figure 1B:
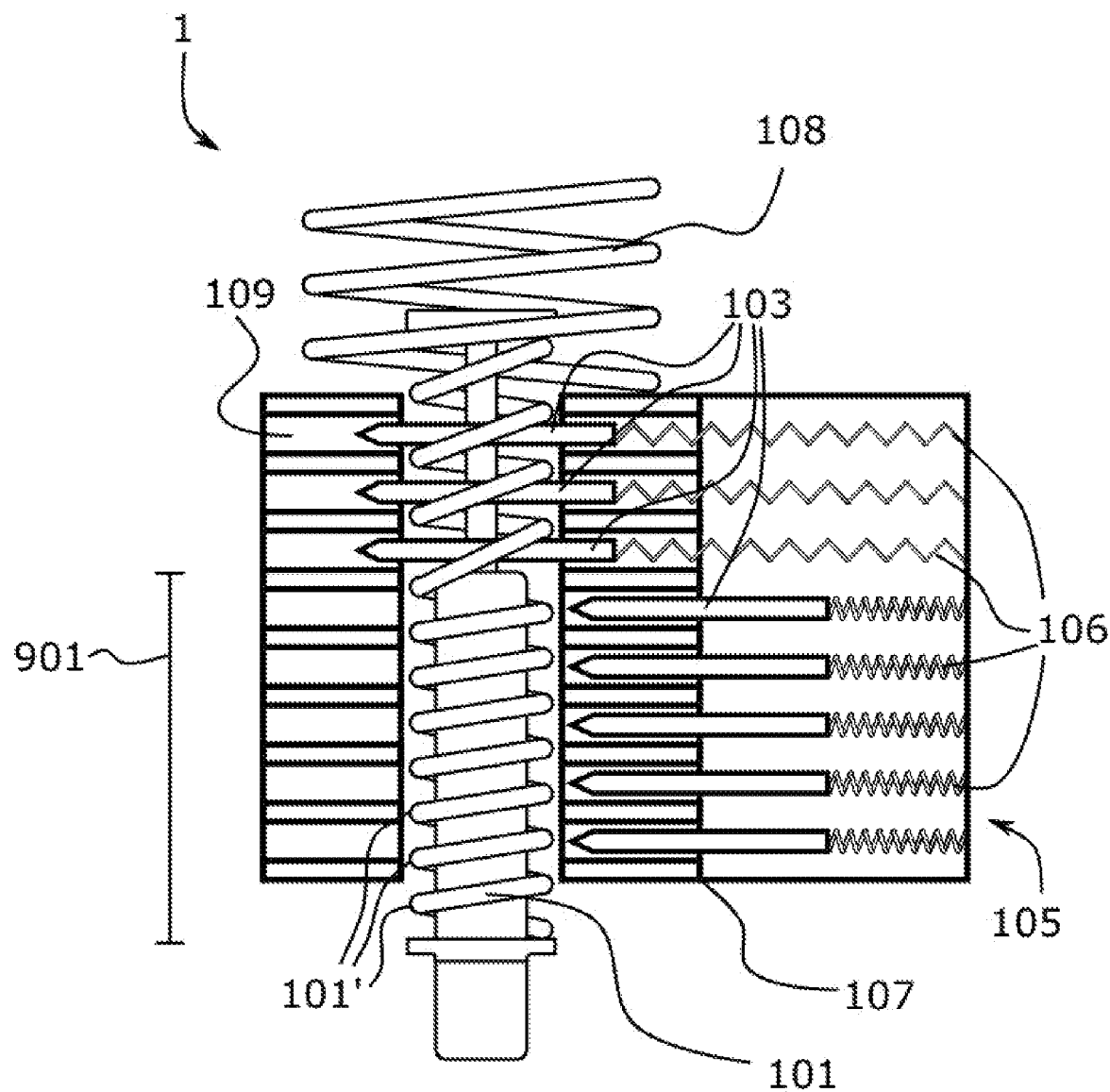
FIG. 1B is a schematic view of the wheel suspension arrangement of FIG. 1A, when a number of the control members have moved to the advanced position and the suspension spring has been partially compressed.

FIG. 1B is a schematic view of the wheel suspension arrangement 1 of FIG. 1A. Here, a number of the control members 103 have moved to the advanced position and the suspension spring 101 has been partially compressed. This could for example be an illustration of what the wheel suspension arrangement 1 may look like when a vehicle to which the wheel suspension arrangement 1 is attached takes a moderately sharp turn. The centrifugal force experienced by the control members 103 is sufficient to overcome the bias of the three control springs 106 located closest to the vehicle body connecting side 113, but not strong enough to overcome the remaining control springs' 106 biasing force. Thus, the three control members 103 located closest to the vehicle body connecting side 113 are displaced to the advanced position by means of the centrifugal force, such that they intersect the suspension spring 101. This shortens the effective length 901 of the suspension spring 101, thus increasing its effective spring constant.

Figure 1C:
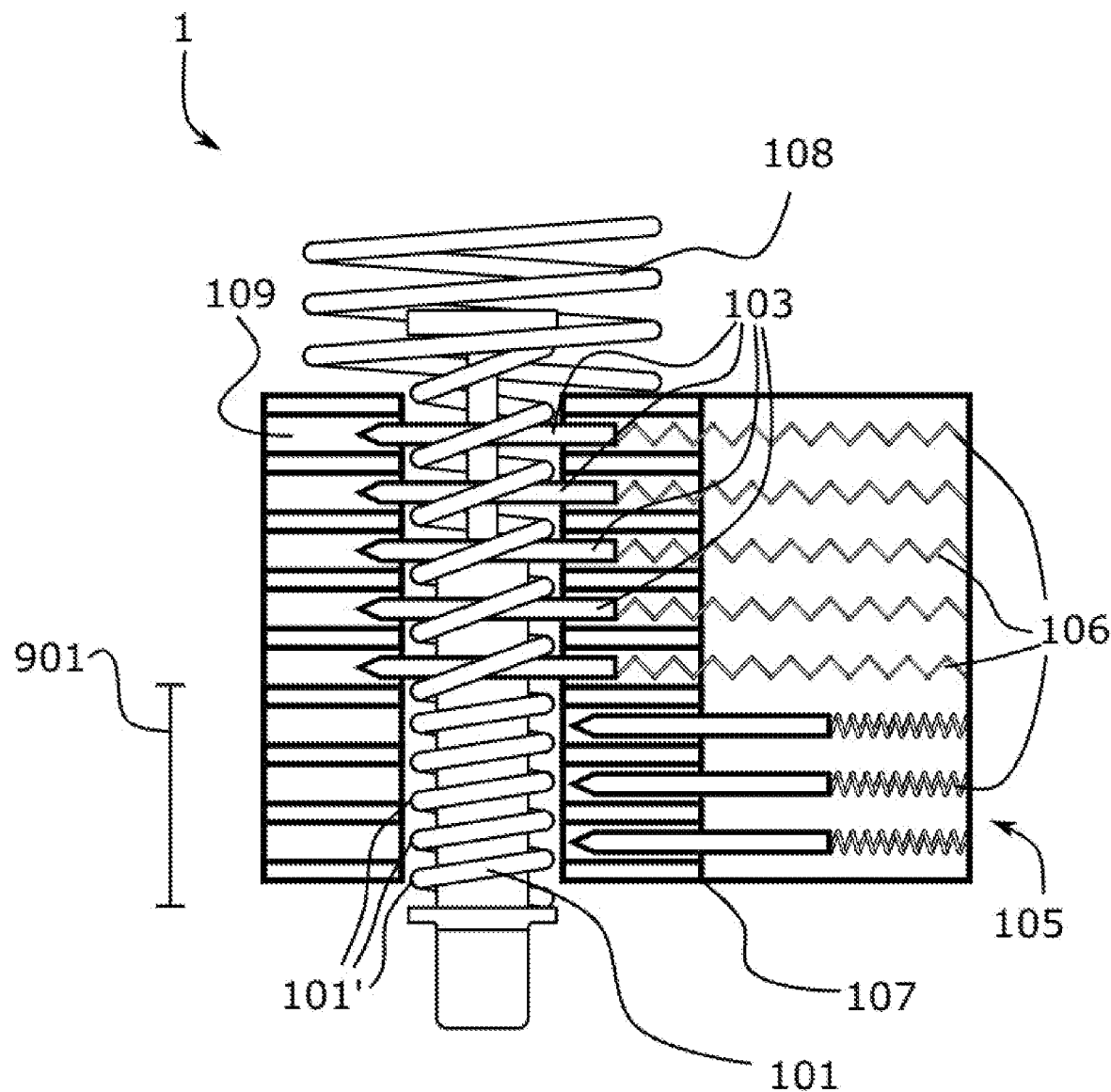
FIG. 1C is a schematic view of the wheel suspension arrangement of FIG. 1A, when even more of the control members have moved to the advanced position, thus further stiffening the suspension spring.

FIG. 1C is, like FIG. 1B, a schematic view of the wheel suspension arrangement 1 of FIG. 1A. Here, even more of the control members 103 have moved to the advanced position than in FIG. 1B, thus further decreasing the effective length 901 of the suspension spring 101. This could for example be an illustration of what the wheel suspension arrangement 1 may look like when a vehicle to which the wheel suspension arrangement 1 is attached takes a sharp turn.

Figure 2A:
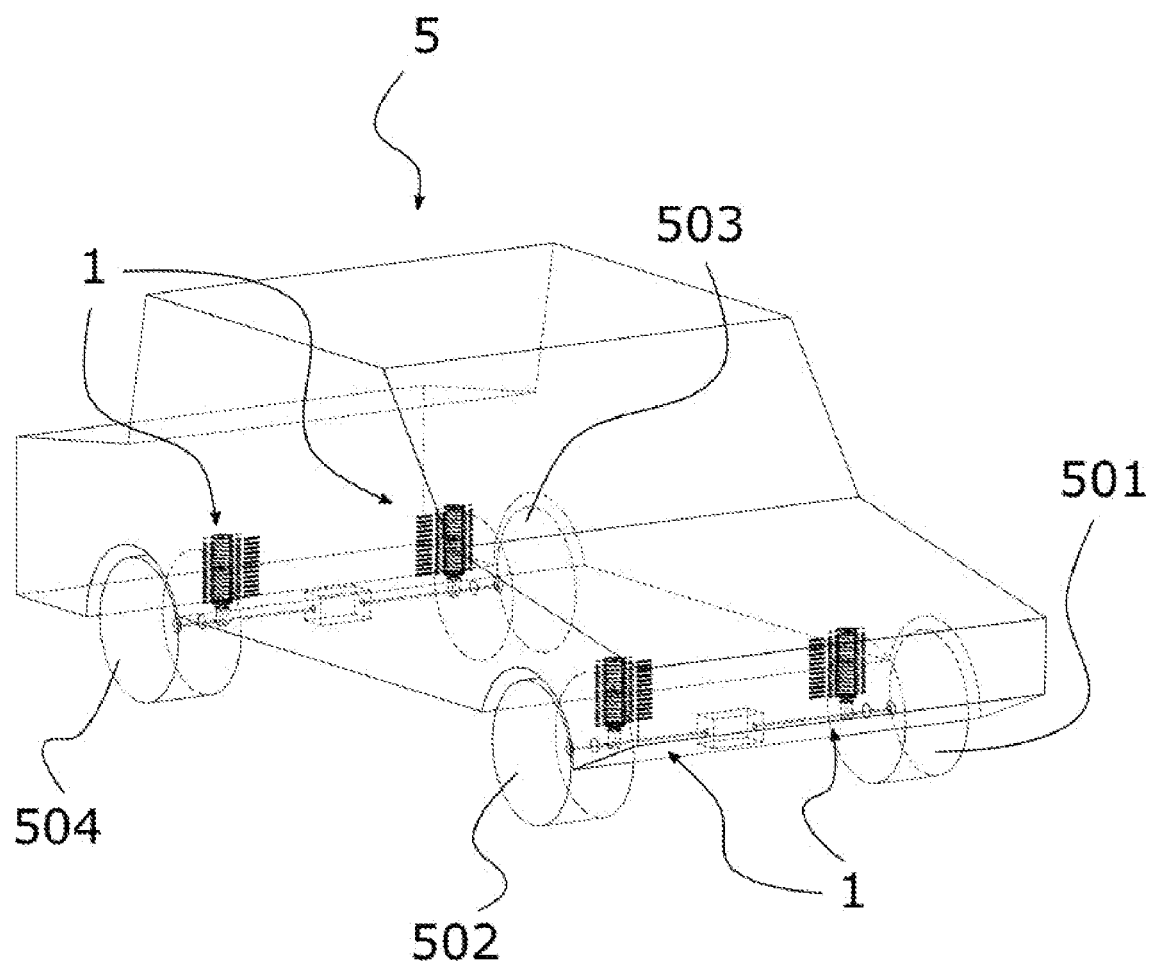
FIG. 2A is a schematic view illustrating the wheel suspension arrangement when attached to the front and rear wheel pairs of a vehicle.
Figure 2B:
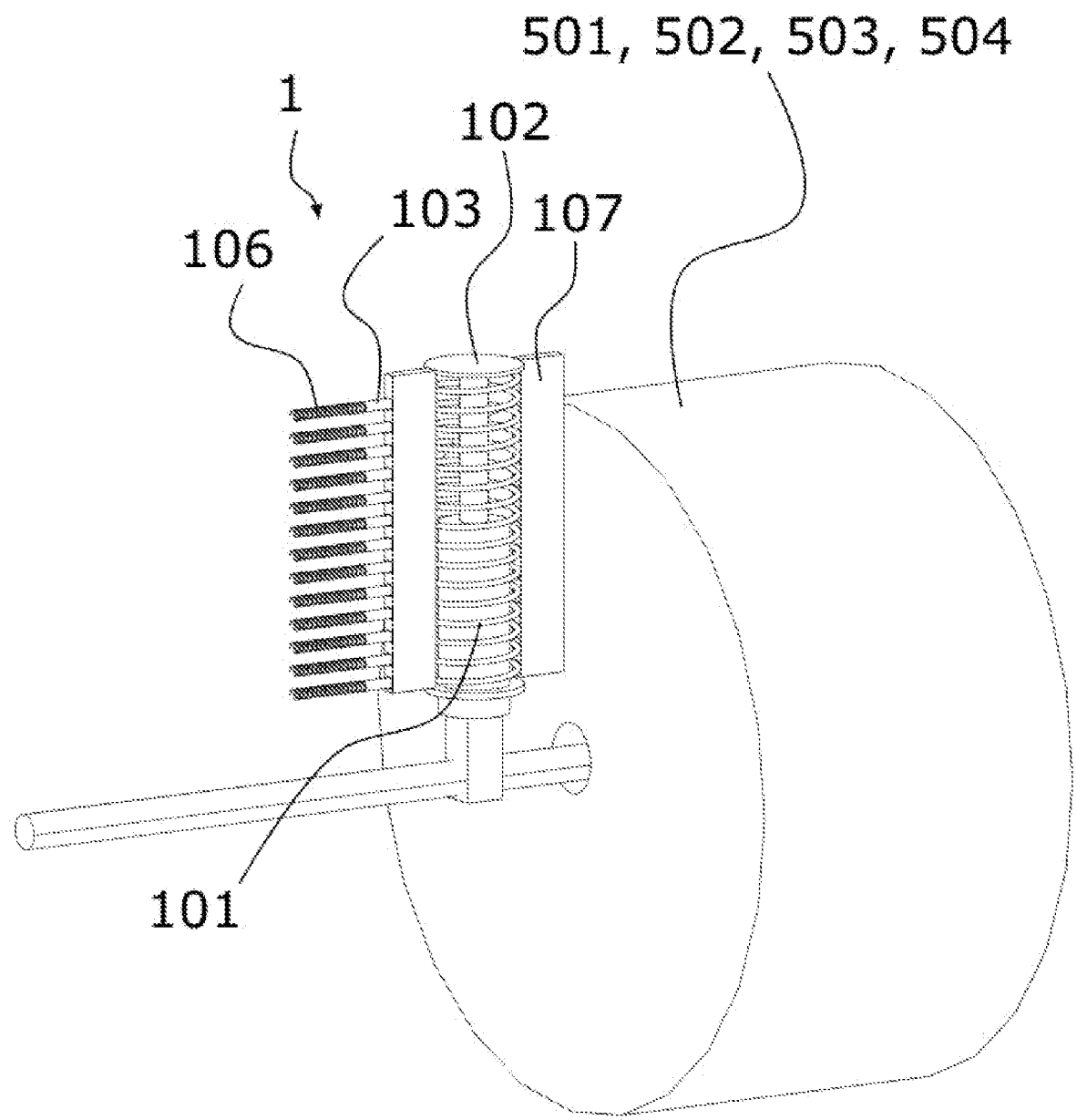
FIG. 2B is a schematic section view illustrating the wheel suspension arrangement when attached to a wheel of a vehicle.

FIG. 2A is a schematic view illustrating the wheel suspension arrangement 1 when attached between the wheels 501, 502, 503, 504 of the front and rear wheel pairs of a vehicle 5. FIG. 2B is a schematic section view illustrating the wheel suspension arrangement 1 when attached to a wheel 501, 502, 503, 504 of a vehicle 5. Each wheel 501, 502, 503, 504 has a wheel suspension arrangement 1 as described in relation to FIGS. 1A-1C, such that the suspension stiffness of that particular wheel may be individually controlled. When attached to a wheel 501, 502, 503, 504 of a vehicle 5, the wheel suspension arrangement 1 is oriented such that the control springs 106 bias the control members 103 in a direction towards a vehicle centreline that is parallel with the longitudinal extension of the vehicle 5. This allows a centrifugal force resulting from the vehicle 5 taking a sharp turn to cause a number of the control members 103 of the wheel suspension arrangement 1 located on the outer side of the turn to slide into engagement with the suspension spring 101. In case of a sharp right turn of vehicle 5, this stiffens the suspension spring 101 on the wheels 501, 503 on the outer side of the turn, while the suspension stiffness of the wheels 502, 504 on the inner side of the turn remain unaffected. In other words, if the vehicle 5 takes a sharp right turn, a number of the control members 103 of the front left and rear left wheel 501, 503 will, due to centrifugal forces exceeding the control spring 106 bias, slide to engage the suspension springs 101 of those wheels 501, 503, thereby stiffening them and reducing the amount of roll of the vehicle 5. The control members 103 of the wheel suspension arrangements 1 provided at the front right and rear right wheels 502, 504 will not slide to engage the suspension spring 101. The opposite will happen if the vehicle 5 makes a sharp left turn.

Using the wheel suspensions arrangement 1 of the present invention, and attaching it to a vehicle 5 as described above, results in that each wheel 501, 502, 503, 504 has an individual suspension stiffness control that is based on current driving conditions. When driving at a given speed in a straight line, there will be no centrifugal or inertial forces acting upon the control members 103 of the wheel suspension arrangement 1 of each wheel 501, 502, 503, 504. Thus, none of the control springs 106 that hold the control members 103 will be loaded, causing the control members 103 to stay in the retracted position. This means that the suspension springs 101 of each wheel 501, 502, 503, 504 will act as independent springs with no additional stiffening relative to each other.

The person skilled in the art realizes that the present invention by no means is limited to the embodiments described above. The features of the described embodiments may be combined in different ways, and many modifications and variations are possible within the scope of the appended claims. In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements.

What is claimed is:

1. A wheel suspension arrangement comprising:
a suspension spring,
a plurality of control members arranged to control a stiffness of said suspension spring,
   wherein the control members are displaceable relative to said suspension spring between a retracted position, in which the control members do not interfere with an operation of the suspension spring, and an advanced position, in which the control members interfere with the operation of the suspension spring in a way that a stiffness of said suspension spring is increased,
a biasing means configured to bias said control members towards said retracted position, and
a wheel connecting side and a vehicle body connecting side,
   wherein control members located closer to the wheel connecting side are more strongly biased towards the retracted position than control members located closer to the vehicle connecting side,
wherein the plurality of control members are arranged to affect the suspension spring at spaced locations in a longitudinal axis of the suspension spring, and
wherein said biasing means comprises a plurality of control springs, wherein each one of said plurality of control members is coupled to a single respective control spring.

2. The Wheel suspension arrangement according to claim 1, wherein said control members, in said advanced position, decreases an effective length of the suspension spring.

3. The Wheel suspension arrangement according to claim 1, wherein said control members intersect said suspension spring in said advanced position.

4. The Wheel suspension arrangement according to claim 1, wherein said control members are displaceable in a direction transverse to a longitudinal axis of the suspension spring.

5. The Wheel suspension arrangement according to claim 1, wherein said suspension spring is a coil spring and wherein the control members are arranged to protrude between at least two coils of the coil spring in said advanced position.

6. The Wheel suspension arrangement according to claim 1, wherein the wheel suspension arrangement comprises a support member arranged to support the control members in the advanced position.

7. The Wheel suspension arrangement according to claim 6, wherein said support member comprises at least one slot, inside which a control member of the plurality of control members is arranged and along which said control member is displaceable.

8. The Wheel suspension arrangement according to claim 1, wherein the plurality of control members are arranged in parallel with each other.

9. The Wheel suspension arrangement according to claim 1, wherein said control members are displaceable along a direction that is perpendicular to a longitudinal axis of the suspension spring.

10. The Wheel suspension arrangement according to claim 1, wherein said control members are slidably displaceable when the wheel suspension arrangement is subjected to a force that is perpendicular to a longitudinal axis of the suspension spring.

11. A wheel suspension arrangement comprising:
a suspension spring,
a plurality of control members arranged to control a stiffness of said suspension spring,
  wherein the control members are displaceable relative to said suspension spring between a retracted position, in which the control members do not interfere with an operation of the suspension spring, and an advanced position, in which the control members interfere with the operation of the suspension spring in a way that a stiffness of said suspension spring is increased, and
a biasing means configured to bias said control members towards said retracted position,
wherein the plurality of control members are arranged to affect the suspension spring at spaced locations in a longitudinal axis of the suspension spring,
wherein said biasing means comprises a plurality of control springs, wherein each one of said plurality of control members is coupled to a respective control spring,
wherein at least two of the control springs are arranged with different stiffnesses.

12. The Wheel suspension arrangement according to claim 11, wherein said control members, in said advanced position, decreases an effective length of the suspension spring.

13. The Wheel suspension arrangement according to claim 11, wherein said control members intersect said suspension spring in said advanced position.

14. The Wheel suspension arrangement according to claim 11, wherein said control members are displaceable in a direction transverse to a longitudinal axis of the suspension spring.

15. The Wheel suspension arrangement according to claim 11, wherein said suspension spring is a coil spring and wherein the control members are arranged to protrude between at least two coils of the coil spring in said advanced position.

16. The Wheel suspension arrangement according to claim 11, wherein the wheel suspension arrangement comprises a support member arranged to support the control members in the advanced position.

17. The Wheel suspension arrangement according to claim 16, wherein said support member comprises at least one slot, inside which a control member of the plurality of control members is arranged and along which said control member is displaceable.

18. A wheel suspension arrangement comprising:
a suspension spring,
a plurality of control members arranged to control a stiffness of said suspension spring,
  wherein the control members are displaceable relative to said suspension spring between a retracted position, in which the control members do not interfere with an operation of the suspension spring, and an advanced position, in which the control members interfere with the operation of the suspension spring in a way that a stiffness of said suspension spring is increased,
a biasing means configured to bias said control members towards said retracted position, and
a wheel connecting side and a vehicle body connecting side, wherein the stiffness of the control springs increases from the vehicle body connecting side to the wheel connecting side,
wherein the plurality of control members are arranged to affect the suspension spring at spaced locations in a longitudinal axis of the suspension spring, and
wherein said biasing means comprises a plurality of control springs, wherein each one of said plurality of control members is coupled to a single respective control spring.

19. The Wheel suspension arrangement according to claim 18, wherein said control members, in said advanced position, decreases an effective length of the suspension spring.

* * * * *